(12) United States Patent
Landreth et al.

(10) Patent No.: US 6,176,953 B1
(45) Date of Patent: Jan. 23, 2001

(54) ULTRASONIC WELDING PROCESS

(75) Inventors: Bobby Dean Landreth, Ft. Lauderdale; Steven D. Pratt; Sivakumar Muthuswamy, both of Plantation; Ronald J. Kelley, Coral Springs, all of FL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/309,978

(22) Filed: May 11, 1999

Related U.S. Application Data

(60) Provisional application No. 60/102,005, filed on Sep. 22, 1998.

(51) Int. Cl.[7] ................................................. B32B 31/18
(52) U.S. Cl. ...................... 156/73.3; 156/73.1; 156/309.6
(58) Field of Search ................................ 156/73.1, 73.3, 156/250, 251, 308.2, 309.6, 580.1, 580.2; 264/442, 443, 445

(56) References Cited

U.S. PATENT DOCUMENTS

| | | | |
|---|---|---|---|
| 5,360,499 | * 11/1994 | Savovic et al. | 156/73.1 |
| 5,397,408 | * 3/1995 | Guzik et al. | 156/73.1 |
| 5,401,342 | * 3/1995 | Vincent et al. | 156/73.1 |
| 5,411,616 | * 5/1995 | Desai et al. | 156/73.1 |
| 5,520,775 | * 5/1996 | Fischl et al. | 156/580.1 |
| 5,641,367 | * 6/1997 | Tatsumi | 156/69 |
| 5,944,924 | * 8/1999 | Engle et al. | 156/73.3 |

* cited by examiner

*Primary Examiner*—James Sells
(74) *Attorney, Agent, or Firm*—Dale W. Dorinski

(57) ABSTRACT

An ultrasonically welded joint is made by placing a thermoplastic film (5) between two thermoplastic members (10, 20). The two thermoplastic members each have a mating part of a complex joint. One part of the joint, known as the shear joint (40), serves to shear away part (6) of the film when the two members come together, and another section of the same joint, known as the mash joint (30), serves to bond the film and the two members all together during the ultrasonic welding process.

11 Claims, 3 Drawing Sheets

ULTRASONIC WELDING PROCESS

CROSS REFERENCE TO RELATED APPLICATIONS

This application claims the benefit of U.S. Provisional Application No. 60/102,005 filed Sep. 22, 1998, and assigned to Motorola, Inc.

TECHNICAL FIELD

This invention relates to a method of ultrasonically welding, and more specifically, to a method of ultrasonically welding a film between two thermoplastic members.

BACKGROUND

Ultrasonic welding allows accurate and precise application of energy to selectively melt or weld the desired portions of a plastic assembly. Ultrasonic welding is suitable for most thermoplastic materials, and is widely used in the automotive, packaging, electronic, and consumer industries. In practice, high-frequency (ultrasonic) mechanical vibrations are transmitted by the ultrasonic welding machine to mating plastic parts. At the joint or interface of the two parts, a combination of applied force and surface and/or intermolecular friction increases the temperature until the melting point of the thermoplastic is reached. The ultrasonic energy is then removed and a molecular bond or weld is produced between the two plastic parts.

An ultrasonic welding system typically contains a high-frequency power supply (usually 20–40kHz). The high-frequency energy is directed into a horn which is a bar or a metal section, typically of titanium, aluminum, or hardened steel, dimensioned to be resonant at the applied frequency. The horn contacts the workpiece and transmits the mechanical vibrations into it. A fixture or nest supports and aligns the two parts to be welded. Proper joint design is essential for optimum welding results. Factors such as the type of material, part geometry, and requirements of the welded joint must be considered when determining joint design. A joint should have some means of alignment and a small, uniform initial contact area to concentrate the ultrasonic energy for rapid localized energy dissipation. An energy director, the most commonly used design, consists of a small triangular bead of material on the part surface to be welded. During welding, the interfaces melt and telescope together, producing a weld in the shear mode.

Many types of thermoplastic polymers can be welded. Amorphous resins such as polystyrene, acrylonitrile-butadiene-styrene (ABS), polycarbonate, etc., are very energy efficient and are generally preferred for ultrasonic welding. They are characterized by a random molecular arrangement and a broad softening temperature range. This allows the material to flow easily without premature solidification. Resins that have higher levels of crystallinity require higher ultrasonic energy levels because of their highly-ordered molecular structure. Some dissimilar resins can be welded together if their glass transition temperatures are similar (typically within about 40° F.), such as ABS-to-acrylic, polycarbonate-to-acrylic, and polystyrene-to-polyphenylene oxide.

The conventional wisdom in the art of ultrasonic welding has restricted use to attachment of one plastic piece to another plastic piece. Situations that require several pieces to be joined require two or more separate operations. Clearly it would be an advantageous improvement in the state of the art to be able to weld more than two plastic parts together in a single step.

DETAILED DESCRIPTION OF THE PREFERRED EMBODIMENT

An ultrasonically welded joint is made by placing a thermoplastic film between two thermoplastic members. The two thermoplastic members each have mating parts of a complex joint. One part of the complex joint, generically known as the cutting joint, serves to sever part of the film when the two members come together, and another section of the same complex joint, generically known as the welding joint, serves to bond the film and the two members all together during the ultrasonic welding process.

Figure 1:
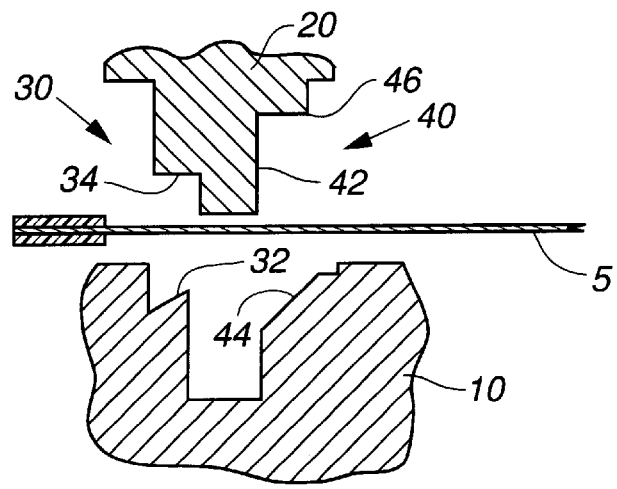
FIG. 1 is a cross-sectional view of various components used to make an ultrasonic weld, in accordance with the invention.

Referring now to FIG. 1, a thermoplastic film 5 is positioned between a first thermoplastic member 10 and a second thermoplastic member 20. Each of the thermoplastic members contains half of a complex, multi-part joint that is used in the ultrasonic welding processes. As used in the context of this invention, a 'joint' generally refers to the specific geometry of the thermoplastic parts prior to their being ultrasonically welded. Likewise, a 'joint weld' consists of the various parts of the 'joint' geometry that have been mated and appropriately melted to form the ultrasonically welded assembly. Those skilled in the art will appreciate that two parts or members form an ultrasonic weld, and each of the two members contains a portion of the joint. Typically, the joint in one member is approximately a mirror image of the joint in the other member, except for minor variations such as energy directors, etc. A key part of our invention is the novel joint that provides two functions, which is heretofore unknown. The first function, that of actually forming the ultrasonic weld, is performed by a portion of our joint generically known as a welding joint. A preferred type of welding joint is known as a mash joint and is depicted in FIG. 1 as reference numeral 30. A mash joint is a specific type of joint design utilizing a 15°–20° chamfer meeting a planar surface. The chamfer 32 provides a point contact against the planar surface 34 during the welding process that ensures that the melted thermoplastic is drawn up and down while encapsulating the melt, guaranteeing a strong, repeatable weld. The mash joint 30 gains added strength by completely encapsulating the melt to provide a hermetic seal. All of the melt is contained, ensuring a good weld and a seal completely around the joint. No melt is squeezed out of the bonding area, in contrast to other prior art joint designs. Tensile strength tests on mash joint welds show a higher strength compared to standard welds. Other types of welding joints, such as step joints or tongue-and-groove joints can also be employed. The second function, that of severing or cutting the thermoplastic film, is accomplished by a portion of our novel joint generically known as a cutting joint. One preferred type of cutting joint is known as a shear joint. The shear joint 40 is a specific type of joint design that incorporates a vertical plane 42 that travels past a closely fitting horizontal or angular plane 44. In practice, when the thermoplastic film 5 is placed between the first thermoplastic member 10 and the second thermoplastic member 20 and the two members are urged together, the two planes 42, 44 provide a shearing action on the thermoplastic film similar to a die stamping operation that serves to cut the film at the point of intersection. Other types of cutting joints that employ appropriately shaped edges (for example, a flat-to-flat shear joint) that are able to cut the thermoplastic film may substituted for the shear joint and still fall within the scope and spirit of our invention.

Figure 2:
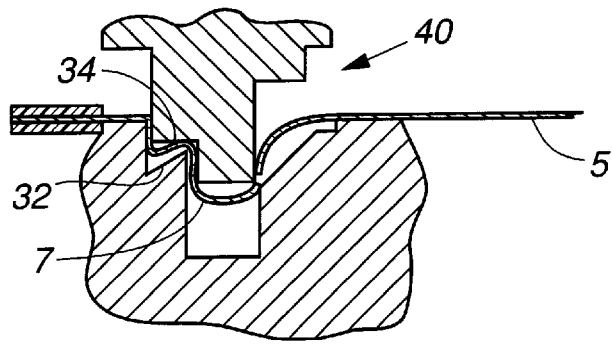
FIG. 2 is cross-sectional view of the assembly shown in FIG. 1 prior to the application of ultrasonic energy, in accordance with the invention.
Figure 3:
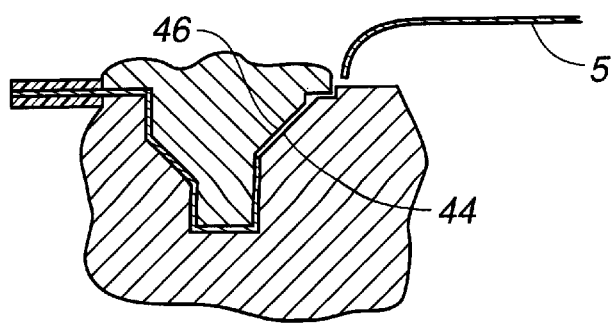
FIG. 3 is cross-sectional view of the assembly shown in FIG. 2 after the ultrasonic welding process in accordance with the invention.

Having described the various components of the materials used to practice our invention, the process will now be described. The thermoplastic film 5 is placed between the two thermoplastic members 10, 20 and the two members are properly situated such that respective portions of the mash joint and the shear joint align. The second thermoplastic member 20 is forced downward toward the film 5 and continues on into the mating cavity in the first thermoplastic member 10. During this process, the thermoplastic film 5 is severed by the shear joint 40. FIG. 2 shows how the shear joint 40 begins to cut the film 5, allowing one portion of the film to be removed from the assembly, and another portion 7 of the film to be captured by the mash joint 30. Note that the chamfer 32 lies against the horizontal plane 34, with the thermoplastic film 5 captured in between. Referring now to FIG. 3, ultrasonic energy is then directed at the assembly at a power level and in a direction sufficient to cause portions of the mash joint and portions of the film that lie in the mash joint to melt together and form a mash joint weld. The use of ultrasonic energy to melt plastics is well known, and the skilled reader will appreciate that appropriate levels of energy must be applied via an ultrasonic horn to the parts for a sufficient time in order to create a good weld. The precise parameters to be used in the welding process will, of course, depend on the physical configuration of the various parts and also on the type of plastic materials employed. However, one of ordinary skill in the art will readily appreciate the novelty and usefulness of our ultrasonic welding process, as it provides the dual role of cutting and sealing/welding. Optionally, the shear joint can be configured to make an ultrasonic weld, in addition to providing a shearing operation on the film. FIG. 3 shows how a protruding portion 46 is melted down to form a weld joint to the angular portion 44.

While the previous description indicates that the two members 10, 20 are brought together prior to the application of the ultrasonic energy, it is also envisioned that these two operations can occur substantially simultaneously. That is, the ultrasonic energy can be applied to the joints while they are moving together and shearing the film, so as to speed up the process. Other modifications, such as heating the film prior to the welding operation, will also come under the purview of the claimed invention.

Figure 4:
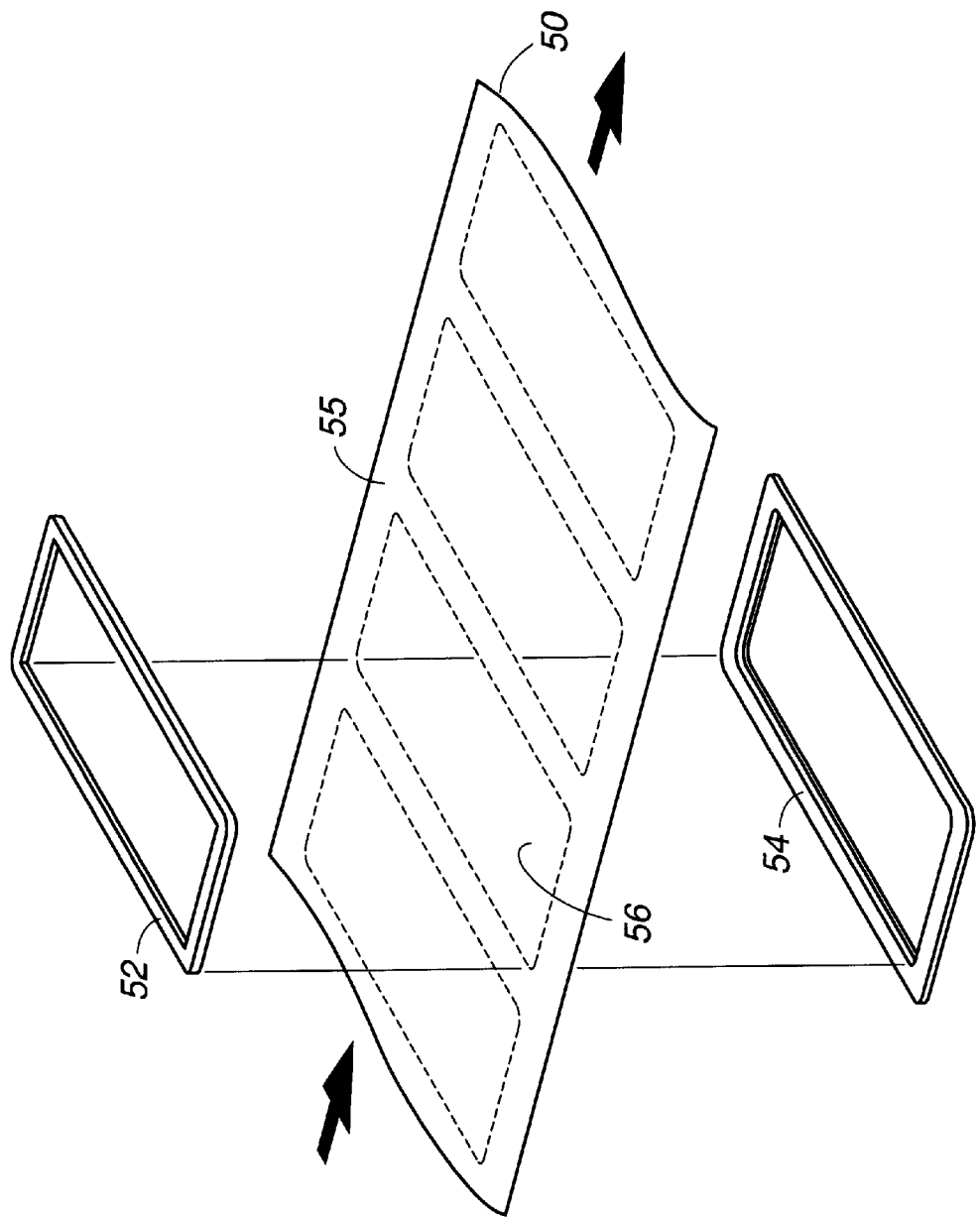
FIG. 4 is an exploded isometric view of a process of ultrasonically welding a laminated membrane electrode sheet to a frame and a bracket, in accordance with the invention.
Figure 5:
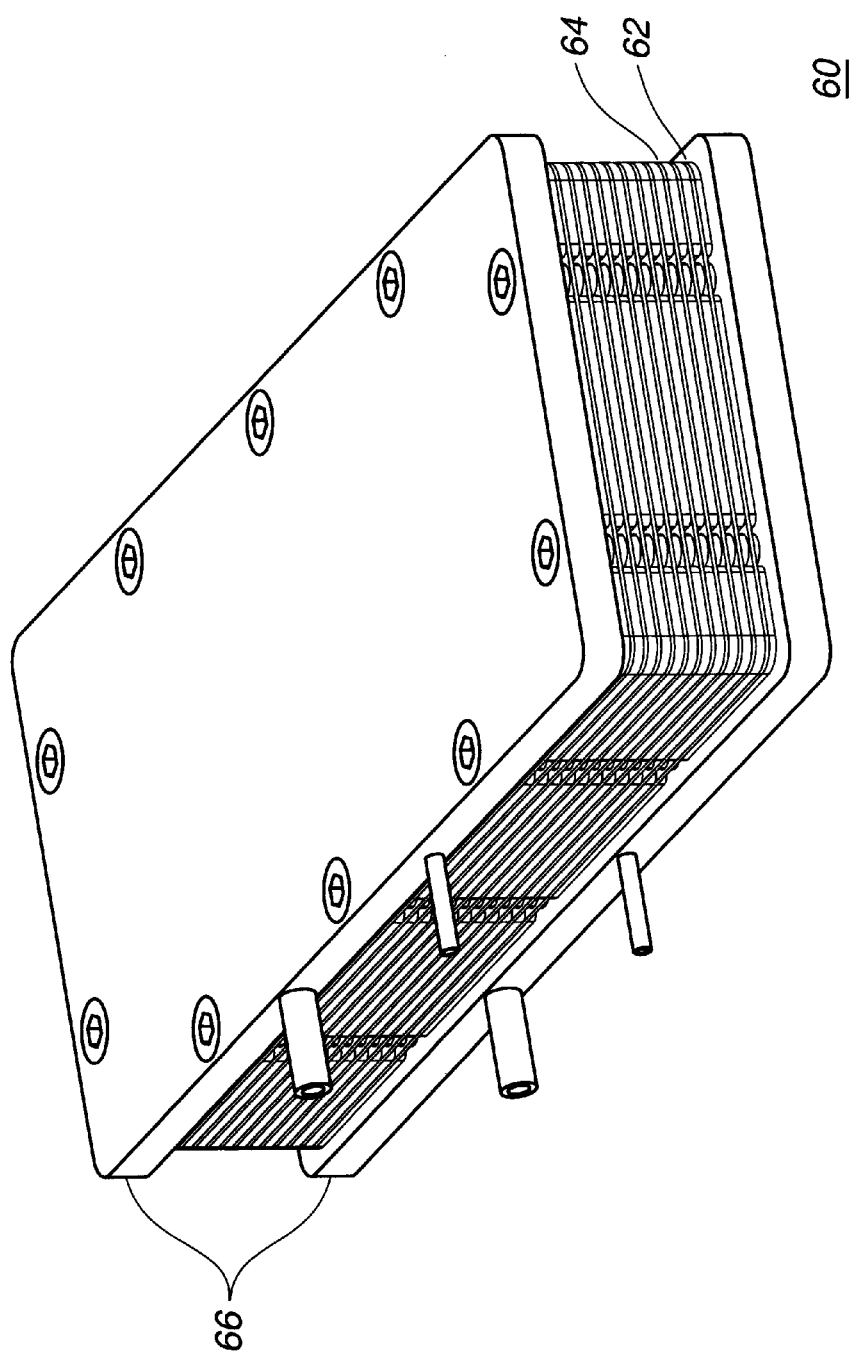
FIG. 5 is an isometric view of an assembled fuel cell in accordance with the invention.

In an alternate embodiment of the invention, the described process can be used to form welded membrane electrode plates for use in fuel cells. Fuel cells are electrochemical cells in which a free energy change resulting from a fuel oxidation reaction is converted into electrical energy. A typical fuel cell consists of a fuel electrode (anode) and an oxidant electrode (cathode), separated by an ion-conducting electrolyte. In this embodiment, the electrolyte is a polymer electrolyte membrane (PEM), such as is typically used in a hydrogen fuel cell, a direct methanol PEM cell, or a PEM fuel cell using an organic fuel such as ethanol or formaldehyde. Suitable materials for the PEM are perfluorinated sulfonic acid derived from fluorinated styrenes, perfluorinated sulfonic acid derived from fluorinated ethylenes, and polybenzimidazole. PEMs are ionic polymers having very high ion conductivity. The polymeric nature of PEMs makes them much easier to handle than liquid electrolytes, and the physical construction of the electrochemical cell is greatly simplified since elaborate seals and containment systems are not needed to contain corrosive liquid electrolytes. A very thin fuel cell can be formed by stacking a plurality of welded membrane electrode plates and a plurality of double sided distribution plates. Referring now to FIG. 4, a membrane electrode laminate sheet 50 consists of a solid electrolyte disposed between and in intimate contact with an anode and a cathode. The sheet is formed such that portions are capable of melting under the conditions experienced during the ultrasonic welding process. A bracket 52, which is equivalent to the previously described second thermoplastic member 20, contains one half of the mash and shear joints (not shown). A frame 54, which is equivalent to the previously described first thermoplastic member 10, contains the other half of the mash and shear joints (not shown). When the bracket and frame are brought together, the shear joint cuts the membrane electrode laminate sheet 50 such that the outer portion 55 is separated from the inner portion 56. The application of ultrasonic energy then causes the inner portion 56 to be welded to the frame 54 and the bracket 52, creating a three-piece welded membrane electrode plate (MEP). Referring to FIG. 5, a fuel cell 60 can then be formed using a plurality of MEPs 62 and distribution plates 64 arranged in an alternating stack such that the fuel distribution channel side of the double sided distribution plate is in intimate and direct contact with the anode of the membrane electrode assembly, and such that the oxidant distribution channel side of the double sided distribution plate is in intimate and direct contact with the cathode of the membrane electrode assembly. Fuel is fed to the fuel distribution channel, and oxidant is fed to the oxidant distribution channel of at least one double sided distribution plate. End caps 66 at the top and at the bottom of the stack holds the entire fuel cell assembly together.

While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. An ultrasonic welding process for cutting and welding a thermoplastic film in a joint, comprising the following steps in the order named:

providing first and second thermoplastic members, each member having a portion of a welding joint and a cutting joint, and providing a thermoplastic film;

arranging the thermoplastic film and the first and second thermoplastic members such that the thermoplastic film is situated between the first and second thermoplastic members and such that respective portions of the welding joint and respective portions of the cutting joint are aligned;

urging the first thermoplastic member toward the second thermoplastic member so as to cause the thermoplastic film to be severed by respective portions of the cutting joint in the first and second thermoplastic members; and providing ultrasonic energy to the first and second thermoplastic members sufficient to cause a portion of the thermoplastic film in the vicinity of the welding joint portions to melt, and sufficient to cause portions of the welding joint in the first and second members to melt, forming a joint weld.

2. The ultrasonic welding process as described in claim 1, wherein the welding joint is a mash joint and wherein the cutting joint is a shear joint.

3. The ultrasonic welding process as described in claim 2, wherein the step of providing ultrasonic energy further comprises:

providing ultrasonic energy to the first and second thermoplastic members sufficient to cause portions of the shear joint in the first and second members to melt, forming a shear joint weld.

4. The ultrasonic welding process as described in claim 1, wherein the step of urging and the step of providing ultrasonic energy are performed simultaneously.

5. The ultrasonic welding process as described in claim 1, wherein the step of urging further comprises removing a portion of the severed thermoplastic film.

6. An ultrasonic welding process for shearing and welding a thermoplastic film in a joint, comprising the following steps:

providing first and second thermoplastic members, each member having a portion of a mash joint and a shear joint, and providing a thermoplastic film;

arranging the thermoplastic film and the first and second thermoplastic members such that the thermoplastic film is situated between the first and second thermoplastic members and such that respective portions of the mash joint and shear joint are aligned;

urging the first thermoplastic member toward the second thermoplastic member so as to capture a portion of the thermoplastic film between respective portions of the mash joint and to cause another portion of the thermoplastic film to be severed by respective portions of the shear joint in the first and second thermoplastic members;

providing ultrasonic energy to the first and second thermoplastic members sufficient to cause a portion of the thermoplastic film in the vicinity of the mash joint portions to melt, and sufficient to melt portions of the mash joint in the first and second members to form a mash joint weld, and sufficient to melt portions of the shear joint in the first and second members to form a shear joint weld; and removing the severed portion of the thermoplastic film.

7. The ultrasonic welding process as described in claim 6, wherein the step of urging and the step of providing ultrasonic energy are performed simultaneously.

8. An ultrasonic welding process for welding a thermoplastic film in a joint, comprising the following steps:

providing first and second thermoplastic members, each member having a portion of a welding joint, and providing a thermoplastic film;

arranging the thermoplastic film and the first and second thermoplastic members such that the thermoplastic film is situated between the first and second thermoplastic members and such that respective portions of the welding joint are aligned;

urging the first thermoplastic member toward the second thermoplastic member so as to capture a portion of the thermoplastic film between respective portions of the welding joint; and providing ultrasonic energy to the first and second thermoplastic members sufficient to cause a portion of the thermoplastic film in the vicinity of the welding joint portions to melt, and sufficient to melt portions of the welding joint in the first and second members to form a weld.

9. An ultrasonic welding process for shearing and welding a membrane electrode laminate between a bracket and a frame, comprising the following steps in the order named:

providing a bracket and a frame, each having a portion of a mash joint and a shear joint, and providing a membrane electrode laminate sheet;

arranging the membrane electrode laminate sheet and the bracket and frame such that the membrane electrode laminate sheet is situated between the bracket and frame and such that respective portions of the mash joint and shear joint are aligned;

urging the bracket toward the frame so as to capture a portion of the membrane electrode laminate sheet between respective portions of the mash joint and to cause another portion of the membrane electrode laminate sheet to be severed by respective portions of the shear joint in the bracket and frame;

providing ultrasonic energy to the bracket and frame sufficient to cause a portion of the membrane electrode laminate sheet in the vicinity of the mash joint portions to melt, and sufficient to cause portions of the mash joint in the bracket and frame to melt, forming a mash joint weld.

10. The ultrasonic welding process as described in claim 9, wherein the step of providing ultrasonic energy creates a welded membrane electrode plate consisting of the membrane electrode laminate, the bracket and the frame.

11. The ultrasonic welding process as described in claim 10, further comprising a step, after the step of providing ultrasonic energy, of assembling a plurality of welded membrane plates together to form a fuel cell.

* * * * *